(12) United States Patent
Noui et al.

(10) Patent No.: US 12,216,279 B2
(45) Date of Patent: Feb. 4, 2025

(54) LIGHT PROJECTOR MODULE

(71) Applicant: TriLite Technologies GmbH, Vienna (AT)

(72) Inventors: Louahab Noui, East Sussex (GB); Joerg Reitterer, Brunn am Gebirge (AT); Michael Schoeffmann, Baden (AT)

(73) Assignee: TriLite Technologies GmbH, Vienna (AT)

( * ) Notice: Subject to any disclaimer, the term of this patent is extended or adjusted under 35 U.S.C. 154(b) by 470 days.

(21) Appl. No.: 17/746,340

(22) Filed: May 17, 2022

(65) Prior Publication Data

US 2022/0373804 A1    Nov. 24, 2022

(30) Foreign Application Priority Data

May 20, 2021    (EP) .................................... 21175019

(51) Int. Cl.
*G02B 27/01*    (2006.01)
*G02B 26/08*    (2006.01)
*H04N 9/31*    (2006.01)

(52) U.S. Cl.
CPC ..... *G02B 27/0172* (2013.01); *G02B 26/0833* (2013.01); *G02B 27/0176* (2013.01); *H04N 9/3144* (2013.01); *H04N 9/3152* (2013.01); G02B 2027/0154 (2013.01)

(58) Field of Classification Search
CPC ............ G02B 27/0176; G02B 27/0172; G02B 26/0833; G02B 27/104; G02B 27/0966; H04N 9/3152; H04N 9/3129
See application file for complete search history.

(56) References Cited

U.S. PATENT DOCUMENTS

2018/0210216 A1    7/2018    Holland et al.

FOREIGN PATENT DOCUMENTS

JP    2015-190988    11/2015

OTHER PUBLICATIONS

Extended European Search Report in corresponding European Patent Application No. 21 17 5019.5, dated Oct. 29, 2021.

*Primary Examiner* — Ryan D Howard
(74) *Attorney, Agent, or Firm* — Hoffmann & Baron, LLP

(57) ABSTRACT

The disclosed subject matter relates to a light projector module, comprising: a base plate, a light source on one side of the base plate, a micro-electro-mechanical-system (MEMS) scanning assembly on the base plate, and a set of at least one lens mounted on the one side of the base plate between the light source and the MEMS scanning assembly, wherein the MEMS scanning assembly has an arm mounted on and extending from the other side of the base plate, a scanning mirror being movably mounted on the arm and facing the base plate, and wherein a light guide is mounted on the base plate or the arm for directing the at least one light beam from the lens set on the one side to the scanning mirror on the arm extending from said other side of the base plate.

20 Claims, 4 Drawing Sheets

LIGHT PROJECTOR MODULE

CROSS-REFERENCE TO RELATED APPLICATIONS

This application claims priority to the European Patent Application No. 21 175 019.5 filed May 20, 2021, the disclosure of which is incorporated herein by reference.

TECHNICAL FIELD

The present disclosed subject matter relates to a light projector module.

BACKGROUND

Light projector modules are commonly used in virtual reality (VR) or augmented reality (AR) glasses, helmets or head-up displays for a broad range of applications like navigation, training, entertainment, education or work. A light source emits one or usually three (red, green, blue) light beams carrying an image comprised of pixels onto a moving micro-electro-mechanical-system (MEMS) mirror which deflects the light beams into subsequent directions (angles), one direction (angle) per pixel of the image. For example, the MEMS mirror oscillates fast about a vertical axis and slowly about a horizontal axis to sweep the directions and, thus, scan the light beam/s over the pixels of a display area row by row and line by line.

In VR applications, the display area is typically a (miniature) reflective screen in front of the user's eye. In AR applications the display area is a semi-transparent combiner which redirects the light beam/s towards the user's eye while concurrently superposing them with light field from a surrounding. In either case the cornea and the lens of the user's eye focus each light beam from a specific direction onto one image point on the retina, so that all image points on the retina then form the image perceived by the user. In head mounted displays the light projector may even project the scanned light beam/s directly into the user's eye, without any reflective screen or semi-transparent combiner. In general video beamer applications the light projector module can be used to project an image onto an external screen like a reflective wall or movie screen.

For light projector modules used in VR or AR glasses, helmets and other head-mounted displays it is desirable to mount the light projector module at a distance as close to the display area as possible, be it a semitransparent combiner, miniature screen or the user's eye, to give the user a field of view as large as possible. In prior art light projector modules, however, the mounting distance has a lower limit due to the modules' internal design. To obtain a larger field of view and, hence, larger image either additional optics or a larger light projector module had to be used which, however, is bulky and heavy for the wearer.

BRIEF SUMMARY

It is an object of the present disclosed subject matter to provide a light projector module which can be mounted as close as possible to a display area to maximize the field of view and image for the user and at the same time is compact and light-weight for maximum wearer comfort.

This object is achieved with a light projector module, comprising:
a base plate with two opposite sides,
a light source mounted on one side of said two opposite sides of the base plate for emitting at least one light beam,
a micro-electro-mechanical-system, MEMS, scanning assembly mounted on the base plate at a distance from the light source for scanning the at least one light beam over a display area, and
a set of at least one lens mounted on said one side of the base plate between the light source and the MEMS scanning assembly,
wherein the MEMS scanning assembly has an arm mounted on and extending from the other side of said two opposite sides of the base plate, and has a scanning mirror being movably mounted on the arm and facing said other side of the base plate, and
wherein a light guide is mounted on the base plate or the arm for directing the at least one light beam from the lens set on said one side to the scanning mirror on the arm extending from said other side of the base plate.

By positioning the light source and lens set on one side and the MEMS scanning assembly on the other side of the base plate, with a light guide directing the light beam/s from the lens set to the scanning mirror of the MEMS scanning assembly, and by putting the scanning mirror on an arm extending from the other side of the base plate, the scanning mirror—which projects the beam/s and hence the output image of the module—can be mounted as close as possible to any desired display area, be it a semitransparent combiner, a reflective (miniature) screen or even directly the user's eye. Minimizing the mounting distance maximizes the field of view and hence the size of the image for the user without the need of sizing-up the projector module itself. As a consequence, a very compact and lightweight light projector module with a large field of view is created. The light projector module of the disclosed subject matter can be unobtrusively integrated into any head-mounted ("wearable") display device, e.g., into a temple or the frame of VR or AR glasses, for maximum wearer comfort.

For minimizing the distance of the scanning mirror from the display area the arm optionally faces an end of the base plate and the light guide wraps around that end of the base plate.

For further minimizing the distance of the scanning mirror from the display area, especially for VR or AR applications of the light projector module, it is particularly useful when the arm faces the base plate under an acute angle between 20° and 90°, in particular of about 60°.

According to a further optional feature of the disclosed subject matter the arm is adjustably mounted on the base plate to adjust said acute angle, and/or the light guide comprises a separately adjustable prism or mirror which is mounted on the other side of the base plate facing the scanning mirror. Both measures allow to adjust the overall direction of the image projected by the light projector module onto the display area. This can be used to compensate for any shifts or tilts of the display area, e.g., so-called face wrap tilt angles or pantoscopic tilt angles of eye glasses carrying a semitransparent combiner or miniature screen in a spectacle frame.

In addition or alternatively to adjusting the acute angle between the arm and the base plate the arm can also be rotationally adjustable on the base plate around its axis of extension from the base plate and/or around an axis perpendicular to the base plate. For example, the arm can be swivelled by ±45° around its axis of extension and/or said perpendicular axis to provide a different coupling direction into the combiner without the need for additional mirrors to steer the beam. This increases the adaptability of the projector to different combiner configurations.

The light guide can in principle be any means to direct the light beam/s exiting the lens set to the scanning mirror, e.g., an optical fibre. Optionally, the light guide comprises a sequence of optical prisms and/or mirrors, including any possible sections of air over which the light beam/s travel/s from the lens set to the scanning mirror. The prisms or air sections can even pass through gaps in the base plate or pass by the end of the base plate when the light guide wraps around that end. All prisms can be used either as refractors or as mirrors working by internal total reflection.

When the arm faces the base plate end under an acute angle and a separately adjustable prism or mirror is used, the latter is optionally positioned within the acute angle space formed between said end of the base plate and the scanning mirror. This reduces the length of the base plate and further minimizes the distance of the scanning mirror to the display area.

When the light projector module is used in combination with a semitransparent combiner based on waveguides or reflective holograms, it is particularly useful when the light guide also comprises a wave plate to control the polarisation of the projected light beam/s.

According to a further optional feature of the disclosed subject matter the light guide comprises an aperture. This prevents stray light, e.g., from the surrounding or from unwanted internal reflections in the beam paths of the light beam/s, to hit the scanning mirror which could otherwise affect the sharpness of the image.

For the projection of colour images the light source may be configured to emit three mutually spaced light beams and the light guide may include a beam combiner to combine the three light beams into a combined light beam directed to the scanning mirror.

Furthermore, in any of the above embodiments the lens set may comprise, for each light beam, a first cylindrical lens with a first cylinder axis followed by a second cylindrical lens with a second cylinder axis perpendicular to the first cylinder axis, for example to collimate the light beam/s in the fast and slow axes of laser diodes used in the light source.

The disclosed design of the light projector module has the further benefit of an improved heat dissipation when the base plate and the arm are made of metal and the light source and the arm are each mounted on the base plate in a thermally conductive manner. The primary heat source of the projector is the light source, whereas the MEMS scanning assembly usually generates little waste heat. The arm of the MEMS scanning assembly can therefore be co-used to dissipate as much heat as possible from the light source by convection and radiation into the environment. To this end, the arm can optionally be provided with cooling fins to facilitate thermal convection and radiation. As the arm is already present in the design, no additional mounting space is needed for this cooling.

The disclosed design further allows for an easy alignment and adjustment of the light projector module in the course of its manufacture. The base plate can be provided, between the light source and the MEMS scanning assembly, with a mounting surface accessible at one side of the base plate for adjustably positioning the lens/es of the set on the mounting surface during mounting of the lens/es. In this way, the light projector module can be pre-assembled first without the lens set, and then all lens/es can be positioned, adjusted and fixed in one step on the mounting surface while the light source and (optionally) the scanning mirror are operated and the projected beam/s is/are monitored in the display area for alignment.

BRIEF DESCRIPTION OF THE DRAWINGS

The disclosed subject matter will now be described by means of exemplary embodiments thereof with reference to the enclosed drawings, in which show.

DETAILED DESCRIPTION

Figure 1:
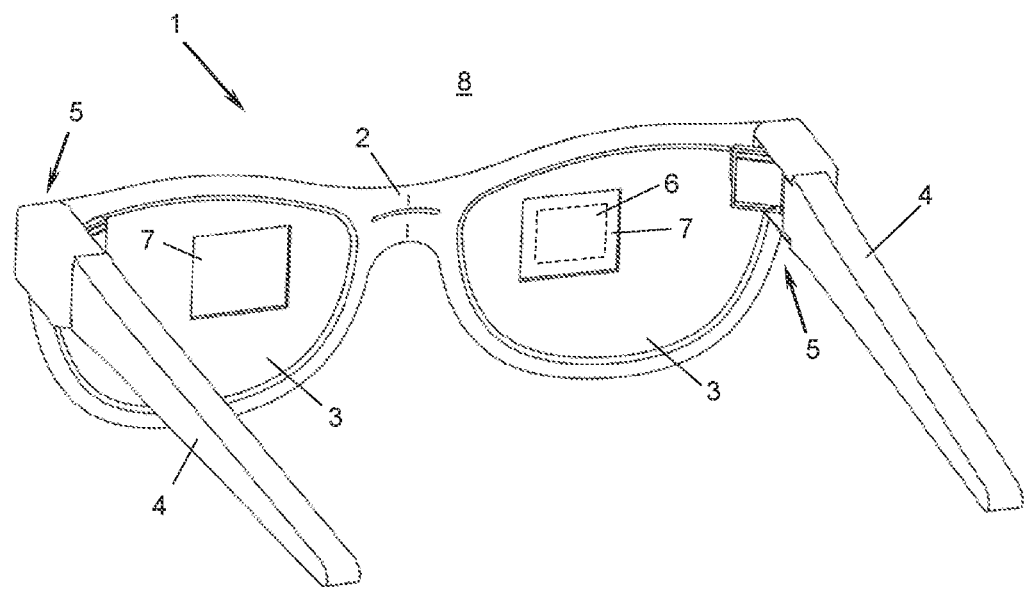
FIG. 1 the light projector module of the disclosed subject matter integrated into a pair of AR glasses in a perspective view.

FIG. 1 shows a pair of augmented reality (AR) glasses 1 comprising a spectacle frame 2, a pair of eye glasses 3 and a pair of temples 4. Attached to each temple 4 is a light projector module 5 which projects an image 6 onto a semi-transparent combiner 7. The semi-transparent combiner 7 is supported by the spectacle frame 2 or an eyeglass 3 or integrated into the latter. The semi-transparent combiner 6, e.g., a waveguide or a holographic combiner, superposes the image 6 projected by the light projector module 5 with a light field from a surrounding 8 so that the wearer of the AR glasses 1 can see the image 6 overlaying ("augmenting") the surrounding 8.

The image 6 can, e.g., be monochromatic or coloured, a single image or part of a video sequence of images. The image/s 6 can augment any surrounding 8 such as a landscape, an urban environment, a road, a classroom, a workplace etc, so that the user can perceive additional information, e.g., for navigation, work, education, training or entertainment as an overlay ("AR image") of the light field ("view") of the surrounding 8.

In the example of FIG. 1, the light projector module 5 (here: two modules 5, one per temple 4) is built into AR glasses and used in combination with a semi-transparent combiner 7. A similar application of the light projector module 5 could be in an AR helmet worn by a user, a handheld AR device like a smartphone with a camera, or an AR head-up display for a vehicle which all use a semi-transparent combiner 7 as the display area of the light projector module 5. If desired, suitable relay optics can be interposed between the light projector module 5 and the semi-transparent combiner 7.

Instead of the semi-transparent combiner 7 the light projector module 5 could be used with any other display area, e.g., a conventional reflective projection screen such as a miniature screen mounted on the frame 2 of virtual reality (VR) glasses, or a projection wall or a movie screen, for example when the light projector module 5 is used as a miniature (or full-scale) video beamer. The light projector module 5 could even be used to directly project the image 6 directly into the user's eye, optionally with suitable optics therebetween.

The light projector module 5 can be built into a separate housing (not shown) or be directly integrated into the spectacle frame 2 or one of its temples 4, i.e., use the spectacle frame 2 or a temple 4 as its housing. For ease of representation, FIGS. 2-5 show the light projector module 5 without housing. It goes without saying that the light projector module 5 will usually have some sort of protective housing which may include a transparent cover, window or dome on its image projecting side for mechanical and dust protection.

Referring to FIGS. 2-5, the light projector module 5 has a base plate 10 with two opposite sides 11, 12, a rear end 13 and a front end 14. The base plate 10 can support a printed circuit board (PCB) 15 at its rear end 13 or be a PCB itself. For better heat dissipation, the base plate 10 is optionally made of a thermally conductive material such as aluminium, steel or another metal or, if the base plate 10 is a PCB itself, may have appropriately metallized areas and/or thermal ducts.

On its one side 11 the base plate 10 mounts a light source 16 for emitting one or more (here: three) light beams 17-19. For a mono- or duochrome image 6 one or two light beams 17 or 17, 18, respectively, may suffice. For a full colour image 6 three light beams 17-19 of the primary colours red, green and blue are used as known in the art. For improving image quality also more than three light beams 17-19 of the primary colours red, green and blue can be used. To add further functionalities such as sensing, light beams with invisible wavelengths, e.g, infrared or ultra-violet, can be integrated as well.

The light beams 17-19 usually carry the image 6 in a time-multiplexed manner, i.e., the intensity values of the image pixels one after the other, e.g., row-by-row and line-by-line per image 6 comprised of a grid of pixels, and image-by-image per video comprised of a sequence of images 6.

The light source 16 can be of any kind including gas lasers, fibre lasers, semiconductor lasers etc. For miniaturisation the light source 16 may employ LEDs, micro LEDs or laser diodes, e.g., edge-emitting laser diodes or surface-emitting laser diodes, one per light beam 17-19.

The light beams 17-19 exit the light source 16 on a front side 20 thereof and are mutually spaced. The light beams 17-19 may exit the side 20 at different positions, under different angles and different mutual spacings. In the shown example, the light beams 17-19 are parallel to each other and lie in a common plane which runs parallel to and at a distance from the one side 11 of the base plate 10. This is not obligatory but makes it easier to combine the different light beams 17-19 into a single combined light beam, as will be explained later on.

Downstream—i.e., when seen in the direction of the light beams 17-19—of the light source 16 is a set of lenses 21-26 for collimating, shaping and/or directing the light beams 17-19. For a light source 16 based on laser diodes the light beams 17-19 will usually diverge when exiting the side 20 so that they need to be collimated as best as possible for a sharp image 6. The lenses 21-26 will therefore usually have the primary function of collimation. As the light beams 17-19 may diverge differently in a first axis 27 and a second axis 28 perpendicular to the first axis 27 (the "fast" and "slow" axes of laser diodes) the lenses 21-26 may need to collimate differently in those two axes 27, 28.

To this end, an astigmatic lens may be used per light beam 17-19, or two separate cylindrical lenses per light beam 17-19, i.e., a first cylindrical lens 21, 23, 25 with a cylinder axis parallel to the first axis 27 followed by a second cylindrical lens 22, 24, 26 with a cylinder axis parallel to the second axis 28. Of course, any other number, type and combination of lenses can be used in the lens set 21-26 to collimate the light beams 17-19 as desired, e.g., also so-called meta lenses. Furthermore, the lenses 21-26 could also shape, shift and/or deflect the light beams 17-19, in particular to make them parallel and lie in a common plane parallel to the side 11, if needed, for example by incorporating prisms, waveguides, diffractive gratings, meta surfaces and the like into the lenses.

The lens see 21-26 is mounted on the base plate 10 in a substantially flat area thereof which constitutes a mounting surface 29. On the mounting surface 29 the lenses 21-26 can be freely adjusted in position ("aligned") with respect to the light beams 17-19, as will be detailed later on.

The mounting surface 29 is accessible from the outside of the light projector module 5 at the side 11 of the base plate 10, at least when the housing of the light projector module 5 is removed. The lens set 21-26 is mounted to the mounting surface 29 by, e.g., clamping it down with a clamp or top plate (not shown), by drilling holes and screwing it down, or by gluing, soldering, sintering or the like. In particular, the lens set 21-26 may first be loosely positioned on the mounting surface 29 with a thin layer of yet unhardened glue G (FIG. 5), then the lenses 21-26 are adjusted in position for alignment, and finally are fixedly mounted to the mounting surface 29 by hardening the glue G. For example, an ultraviolet (UV) curable viscous glue G can be used, which is hardened by UV light for the final fixing of the lenses 21-26 in their adjusted positions.

Downstream of the lens set 21-26 the light beams 17-19 enter a light guide 30 which combines and directs them as a "combined" light beam 31 to a micro-electro-mechanical system (MEMS) scanning assembly 32 on the other side 12 of the base plate 10. To this end, the light guide 30 may pass through or pass ("wrap") around the base plate 10 from the one side 11 to the other side 12. The light guide 30 may be mounted on the base plate 10. In the present example the light guide 30 passes through a cut-out 33 in the front end 14 of the base plate 10. Should the light beams 17-19 exit the lens set 21-26 under an angle that lets the light beams 17-19 pass through or by the base plate 10, that section of the light beams 17-19 where they pass from one side 11 to the other side 12 of the base plate 10 is part of the light guide 30.

In the present example the light guide 30 is a sequence of: a beam combiner section 34 with two semi-transparent mirrors 35, 36 which combine the incident light beams 17-19 to the combined single light beam 31; an inverting prism 37 wrapping around the edge of the base plate 10 by passing through the cut-out 33; an optional wave plate 38 for controlling the polarisation of the light beam/s 17-19, 31; and an optional separate prism or mirror 39 for adjusting the final direction of the light beam/s 17-19, 31 exiting the light guide 30 to the MEMS scanning assembly 32.

The optional prism or mirror 39 is mounted on the other side 12 of the base plate 10 adjustably in the very same way as the lens set 21-26 is mounted on the mounting surface 29, e.g., by first loosely positioning the mirror or prism 39 on the other side 12 via an unhardened glue G, then adjusting it in position and finally hardening the glue G.

The optional wave plate 38 could also be put elsewhere in the path of the light beam/s 17-19, 31, e.g., between the optional prism or mirror 39 and the MEMS scanning assembly 32 or between the lens set 21-26 and the beam combiner section 34. It is also possible to use a separate wave plate 38 for each of the light beams 17-19 before they enter the beam combiner section 34.

Instead of or in addition to the wave plate 38 one or more optical attenuators could be included, too. Such a attenuators could be put anywhere in the path of the light beams 17-19, 31, e.g., at the location described above for the wave plate/s 38. For example, such attenuator/s could be combined with the wave plate/s 38 or integrated therein.

Furthermore, the light guide 31 may optionally include an aperture 40, e.g., at the exit of the inverting prism 37 or wave plate 38. The aperture 40 can be in the form of a sheet metal plate, an opaque sticker or a selectively absorbing coating with a centre hole and will block any stray light outside of the light beams 17-19, 31 from hitting the MEMS scanning assembly 32.

The MEMS scanning assembly 32 is configured to scan the light beams 17-19, 31 received from the light source 16 via the lens set 21-26 and the light guide 30 over the desired display area, e.g., the semi-transparent combiner 7 of the AR glasses 1, a reflective screen in front of the light projector module 5, or even directly the user's eye via optional optics. For example, the MEMS scanning assembly 32 scans the light beam/s 17-19, 31 row by row and/or line by line over the display area to project the image 6 pixel by pixel according to image pixel information modulated onto the light beams 17-19.

Figure 4:
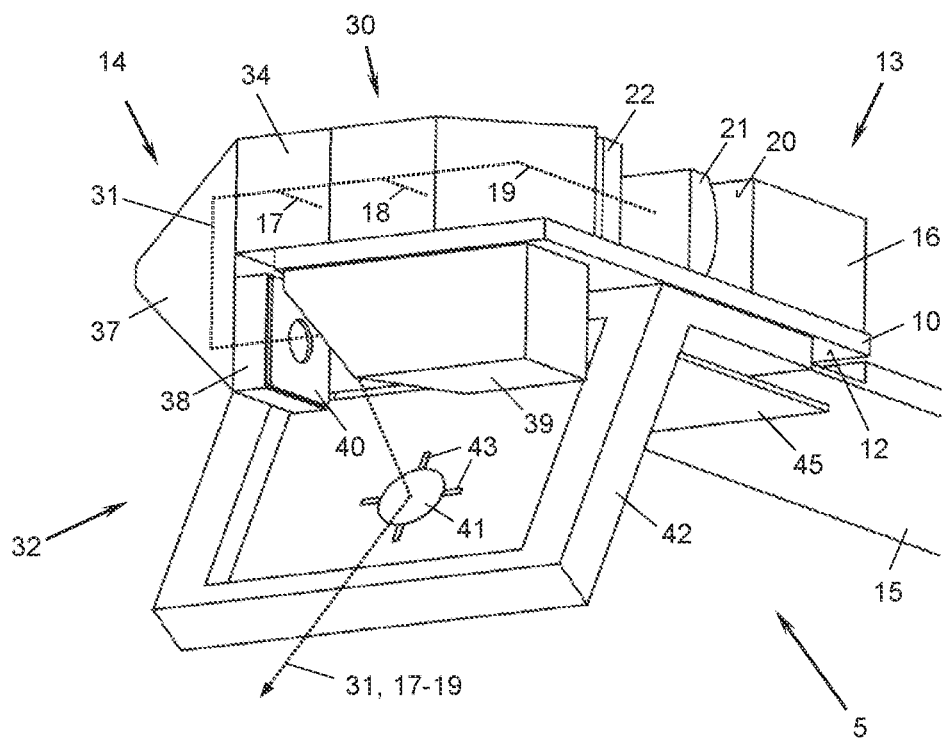
Figure 5:
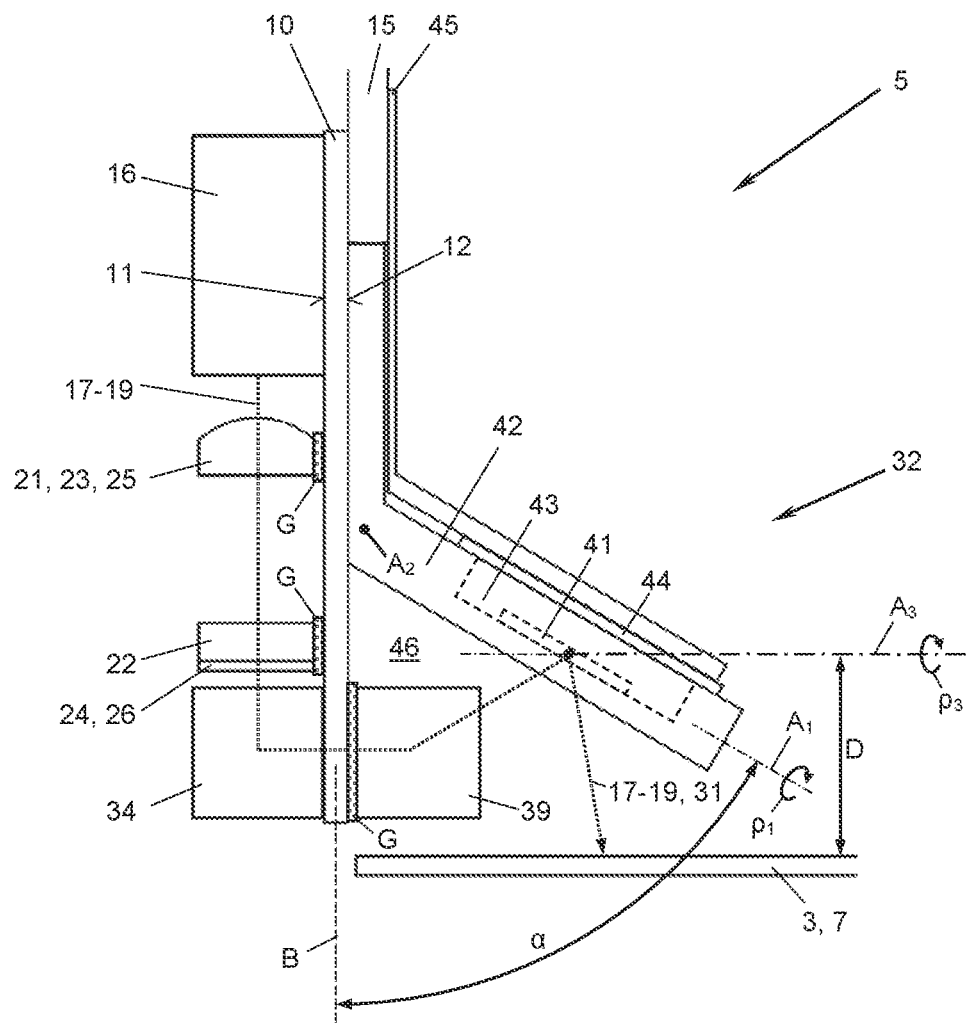

As shown in FIGS. 4 and 5, the MEMS scanning assembly 32 has a scanning mirror 41 movably mounted on an arm 42 which extends from the other side 12 of the base plate 10. The longitudinal axis of the arm 42, i.e., its axis of extension from, the base plate 10, is denoted with $A_1$. The scanning mirror 41 is mounted pivotably about one or optionally two perpendicular axes of pivot on the arm 42 and oscillates about those axis/axes under the agitation of electromechanical, electrostatic or piezoelectric actuators 43 controlled by driving, electronics 44. The driving electronics 44 may be connected via a flexible printed circuit (FPC) or ribbon cable 45 to the PCB 15 of the base plate 10.

To scan the light beam/s 17-19, 31 two-dimensionally over the display area the scanning mirror 41 needs to oscillate about two perpendicular axes of pivot; alternatively, two scanning mirrors 41 each oscillating about a different axis of pivot and working in cascade could be mounted on the arm 42.

The arm 42 may be used to mount the light guide 30 in addition or alternatively to the base plate 10.

The arm 42 extends under an angle α, measured at the front end 14 between its axis of extension $A_1$ and the plane of extension B of the base plate 10, from the other side 12 of the base plate 10 so that the active (reflecting) side of the scanning mirror 41 faces the base plate 10 under that angle α when the scanning mirror 41 is at rest; when it oscillates, the facing angle will vary accordingly. The angle α can be in the range of ≥20° and ≤90° or more, in particular an acute angle in the range of ≥20° and <90°, and particularly about 60° for this purpose.

The arm 42 is as close as possible to the front end 14 of the base plate 10 so that the light projector module 5 can be placed at a minimized distance D from the desired display area, e.g., the semi-transparent combiner 7, a projection screen or the user's eye, to maximize the user's field of view. When a semi-transparent combiner 7 in form of a waveguide is used, the reduction of the distance D has the further benefit that the footprint of the light beam/s 17-19, 31 at the input coupler of the waveguide is reduced, which in turn reduces adverse interactions within the waveguide and the input coupler. As a consequence, a more efficient and more uniform image 6 is presented to the user at the output of the waveguide.

The arm 42 originates at the side 12 from a point close to that point where the light guide 30 exits. In this way, the arm 42 encloses with the front end section of the base plate 10 a small wedge-shaped space 46. This space 46 can conveniently be used to accommodate the end of the inverting prism 37, the wave plate 38 with the aperture 40, and the separate prism or mirror 39, see FIG. 5.

The Y- or bifurcate shape of the front section of the light projector module 5 formed by the arm 42 and the front end section of the base plate 10 allows the scanning mirror 41 to be hit by the light beam/s 17-19, 31 from its side facing the exit of the light guide 30 while concurrently allowing the scanned light beam/s 17-19, 31 to leave the scanning mirror 41 unhinderedly in the desired projection direction. This allows the light projector model 5 to be integrated, e.g., in the corner area of the temple 4 of the spectacle frame 2 with a minimum distance D to the semi-transparent combiner 7 or a projection screen mounted in front of the user's eye.

Figure 2:
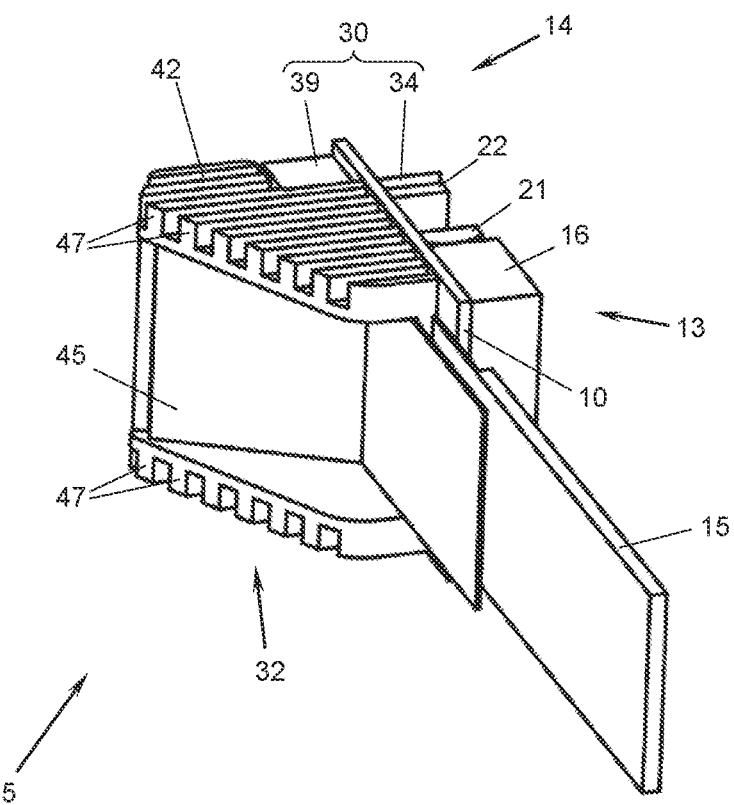
FIGS. 2-5 the light projector module of the disclosed subject matter in a bottom perspective view (FIG. 2), a fragmentary top perspective view (FIG. 3), a fragmentary front perspective view (FIG. 4) and in a fragmentary side view in front of an eye glass (FIG. 5), respectively.
Figure 3:
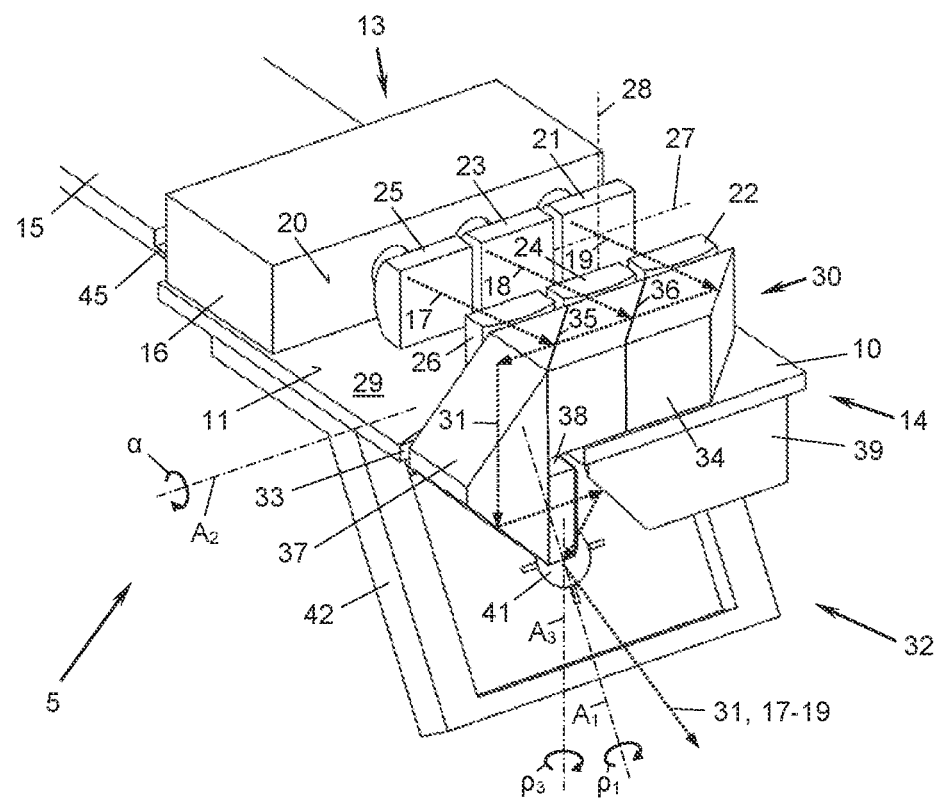

The arm 42 can be a single arm on one side of the scanning mirror 41 or a double arm or frame enclosing the scanning mirror 41 as shown in FIGS. 2-4. The arm 42 could also be a flat plate which supports the scanning mirror 41 on its side facing the base plate 10.

The arm 42 can further be co-used as a heat sink for dissipating waste heat from the light source 16. To this end, the arm 42 is of a thermally conductive material, such as aluminium, steel or another metal, and thermally connected to the light source 16 via the base plate 10 made of metal or appropriately metallized, to conduct the waste heat of the light source 16 into the arm 42. As shown in FIG. 2, the arm 42 can be additionally provided with cooling ribs or fins 47 to improve convection and radiation of the waste heat into the environment. It should be noted that using the arm 42 as heat sink does not use up any additional mounting space for the light projector module 5 as, e.g., the cooling fins 47 can be added to the arm 42 in unused side areas of the wedge-shaped space 46, see FIG. 2.

The arm 42 can optionally be mounted adjustably on the base plate 10 around an axis of pivot $A_2$, for example by articulating the arm 42 on the base plate 10 via a hinge, to change the angle α. Furthermore, the arm 42 can optionally be mounted for a rotational adjustment around its axis of extension $A_1$ with respect to the base plate 10, e.g., via a rotational bearing. The arm 42 can then be swivelled by an angle $\rho_1$ of, e.g., ±45° around its axis of extension $A_1$, to provide for different coupling directions into the display area or semi-transparent combiner 7.

Instead of or in addition to the adjustments around the axes $A_1$ and/or $A_2$, the arm 42 can also be mounted for a rotational adjustment around an axis $A_3$, which is perpendicular to the base plate 10, to swivel it by an angle $\rho_3$ of, e.g., ±45° around that axis $A_3$. The axis $A_3$ may pass, e.g., through the axis $A_2$ or through the center of the mirror 41.

Figure 6A:
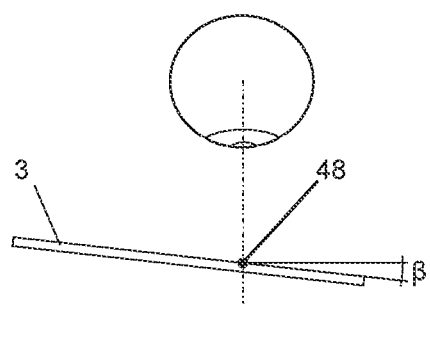
FIGS. 6a and 6b face wrap tilt and pantoscopic tilt angles, respectively, of an eye glass with a schematic representation of an eyeball in top views.
Figure 6B:
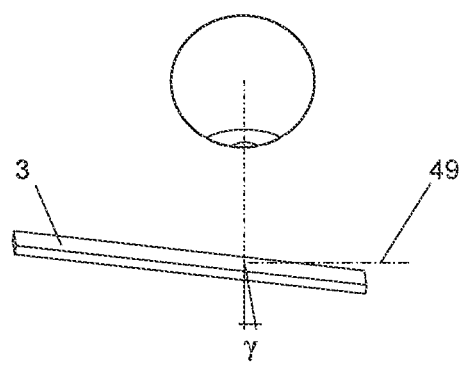

By adjusting the position and angle of the separate prism or mirror 39 and/or the position and angle/s α and/or $\rho_1$ and/or $\rho_3$ of the arm 42 the overall projection direction of the light projector module 5 can be changed. This can be used to adapt the light projector module 5 to application-specific positions and/or tilts of the display area, such as of the semi-transparent combiner 7. FIGS. 6a and 6b show two different types of tilts which a semi-transparent combiner 7 attached to (or integrated into; an eye glass 3 may encounter:

A so-called face wrap tilt angle β about a vertical axis 48 (FIG. 6*a*) and a pantoscopic tilt angle γ about a horizontal axis 49 (FIG. 6*b*).

The angles α, $ρ_1$, $ρ_3$ of the arm 42 could even be changed during operation of the light projector module 5, for example to increase or decrease the effective field of view or to adapt a pair of AR or VR glasses 1 to a foveation of the user's eyes. To this end, one or more suitable actuators can be used to pivot and/or swivel the arm 42 with respect to the base plate 10, e.g., electromechanical, electrostatic, piezoelectric, pneumatic or hydraulic actuators.

Figure 7:
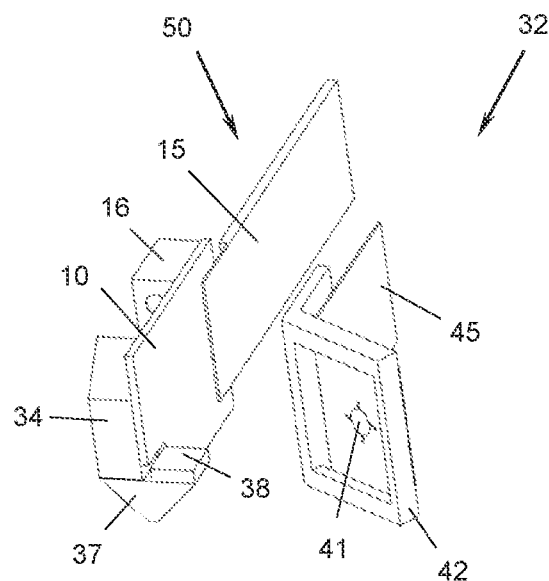
FIGS. 7 and 8 sequential steps of the method of the disclosed subject matter for manufacturing the disclosed light projector module of FIGS. 1-5 in two fragmentary perspective views.
Figure 8:
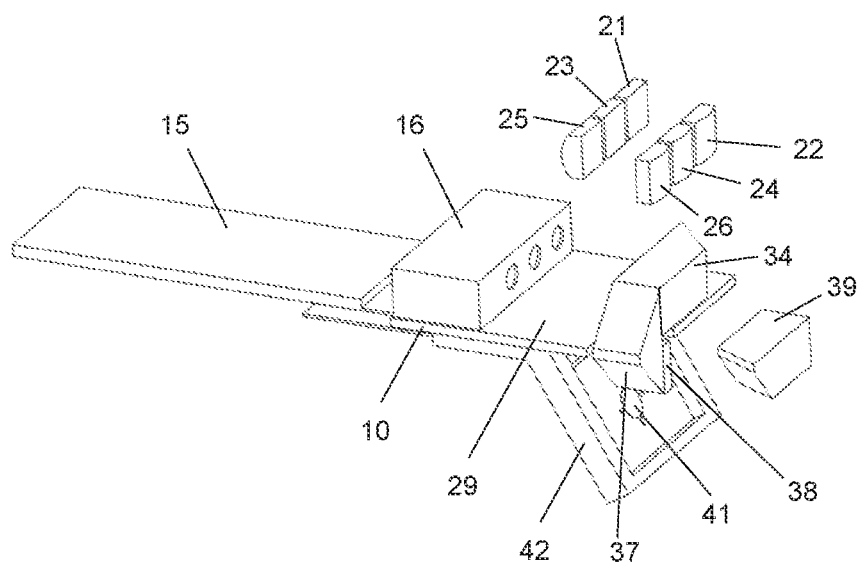

With reference to FIGS. 7 and 8 a method of manufacturing the light projector module 5 will now be explained in detail. The method takes advantage of the mounting surface 29 accessible on the side 11 of the base plate 10 and the wedge-shaped space 46 which is accessible at the front end 14 of the light projector module 5.

In a first step shown in FIG. 7, the light projector module 5 is fully assembled except for the lens set 21-26 and optionally the separate prism or mirror 39. In particular, a sub-assembly 50 comprised of the base plate 10, the (optional) PCB 15, the light source 16 and the light guide 30 (optionally without the prism or mirror 39) is fully assembled and then mated with the fully assembled. MEMS scanning assembly 32 by mounting the arm 42 on the other side 12 of the base plate 10. The sub-assembly 50 and the MEMS scanning assembly 32 are electrically connected via the FPC or ribbon cable 45. As a result of the first step of FIG. 7, the light projector module 5 is insofar fully functional in that the light source 16 can be switched on to emit the light beams 17-19 and the scanning mirror 41 can be operated to oscillate.

In a second step shown in FIG. 8, the lens set 21-26, and optionally also the prism or mirror 39 if it is used and if it has not already been mounted in the first step, are inserted into the beam paths of the light beams 17-19, 31, adjusted in positions ("aligned") and finally mounted fixedly. During the alignment the light source 16 is operated and the final output of the light projector module 5, i.e., the light beam/s 17-19, 31 reflected by the scanning mirror 41 onto the display area, is continuously monitored in the display area for reaching one or more predefined targets. In particular, the individual lenses 21-26 of the set are first loosely positioned on the mounting surface 29, then adjusted in position (location and/or angle) on the mounting surface 29, until the desired alignment of the light beam/s 17-19, 31 exiting the light projector module 5 has been reached, and lastly are mounted fixedly in the adjusted positions on the base plate 10. As discussed, a hardenable glue G can be used for this purpose which first allows a free positioning of the lenses 21-26 during the alignment while still unhardened and then permanently fixes the lens 21-26 in the adjusted, aligned positions after hardening.

Optionally, also the MEMS scanning assembly 32 is operated during the alignment step of FIG. 8. In this way, non-linear effects of the actuators 43 or driving electronics 44 causing an irregular dynamic behaviour of the oscillating scanning mirror 41 or an uneven curvature of the scanning mirror 41 itself can be taken into account when aligning the lens set 21-26. Of course, instead of discrete targets in the display area which are monitored for alignment, target curves in the display area can be monitored for being followed by the light beam/s 17-19, 31 as good as possible when aligning the lenses 21-26.

When the light guide 30 comprises a separately adjustably prism or mirror 39, in the alignment step of FIG. 8 such prism or mirror 39 can be positioned, adjusted and then fixed to the base plate 10 in the same way as described for the lenses 21-26. Similarly, an adjustable arm 42 can be adjusted to reach the alignment target/s or target curves. When the optional aperture 40 is used, it can be aligned and affixed during the alignment step of FIG. 8, too.

The alignment step of FIG. 8 can even be done in the final application environment of the light projector module 5, e.g., after its integration into the pair of AR glasses 1 with the semi-transparent combiner 7. In this way, any mounting tolerances of the light projector module 5 (here: with respect to the semi-transparent combiner 7 and the frame 2) in the final product and any specific optical properties of the latter can be taken into account during alignment. The mounting surface 29 accessible from the one side 11, which is opposite to the other side 12 where the MEMS scanning assembly 32 operates, makes it very easy to position, adjust and mount the lens set 21-26 in the mounting position of the light projector module 5 in the final product.

The disclosed subject matter is not restricted to the specific embodiments described in detail herein, but encompasses all variants, modifications and combinations thereof that fall within the scope of the appended claims.

What is claimed is:

1. A light projector module, comprising:
   a base plate with two opposite sides,
   a light source mounted on one side of said two opposite sides of the base plate for emitting at least one light beam,
   a micro-electro-mechanical-system (MEMS) scanning assembly mounted on the base plate at a distance from the light source for scanning the at least one light beam over a display area, and
   a set of at least one lens mounted on said one side of the base plate between the light source and the MEMS scanning assembly,
   wherein the MEMS scanning assembly has an arm mounted on and extending from the other side of said two opposite sides of the base plate, and has a scanning mirror being movably mounted on the arm and facing said other side of the base plate, and
   wherein a light guide is mounted on the base plate or the arm for directing the at least one light beam from the lens set on said one side to the scanning mirror on the arm extending from said other side of the base plate.

2. The light projector module of claim 1, wherein the arm faces an end of the base plate and the light guide wraps around that end of the base plate.

3. The light projector module of claim 1, wherein the arm faces the base plate under an acute angle between 20° and 90°.

4. The light projector module of claim 3, wherein the arm is adjustably mounted on the base plate to adjust said acute angle.

5. The light projector module of claim 1, wherein the arm is rotationally adjustable around its axis of extension from the base plate.

6. The light projector module of claim 1, wherein the arm is rotationally adjustable around an axis perpendicular to the base plate.

7. The light projector module of claim 1, wherein the light guide comprises a sequence of optical prisms and/or mirrors.

8. The light projector module of claim 1, wherein the light guide comprises an adjustable prism or mirror which is mounted on said other side of the base plate facing the scanning mirror.

9. The light projector module of claim 8, wherein the arm faces an end of the base plate and the light guide wraps around that end of the base plate,
   wherein the arm faces the base plate under an acute angle between 20° and 90°, and
   wherein the prism or mirror lies within the acute angle space formed between said end of the base plate and the scanning mirror.

10. The light projector module of claim 1, wherein the light guide comprises a wave plate.

11. The light projector module of claim 1, wherein the light guide comprises an aperture.

12. The light projector module of claim 1, wherein the light source is configured to emit three mutually spaced light beams and the light guide includes a beam combiner to combine the three light beams into a combined light beam directed to the scanning mirror.

13. The light projector module of claim 1, wherein the lens set comprises, for each light beam, a first cylindrical lens with a first cylinder axis followed by a second cylindrical lens with a second cylinder axis perpendicular to the first cylinder axis.

14. The light projector module of claim 1, wherein the base plate and the arm are made of metal, and the light source and the arm are each mounted on the base plate in a thermally conductive manner.

15. The light projector module of claim 1, wherein the base plate has, between the light source and the MEMS scanning assembly, a mounting surface accessible at said one side of the base plate for adjustably positioning the lens/es of the set on the mounting surface during mounting.

16. The light projector module of claim 1, wherein the light projector module is attached to a temple of a spectacle frame.

17. The light projector module of claim 1, wherein the light projector module is integrated into a temple of a spectacle frame.

18. The light projector module of claim 1, wherein the arm faces the base plate under an acute angle of about 60°.

19. The light projector module of claim 14, wherein the arm is provided with cooling fins.

20. The light projector module of claim 2, wherein the arm faces the base plate under an acute angle between 20° and 90°.

* * * * *